UNITED STATES PATENT OFFICE.

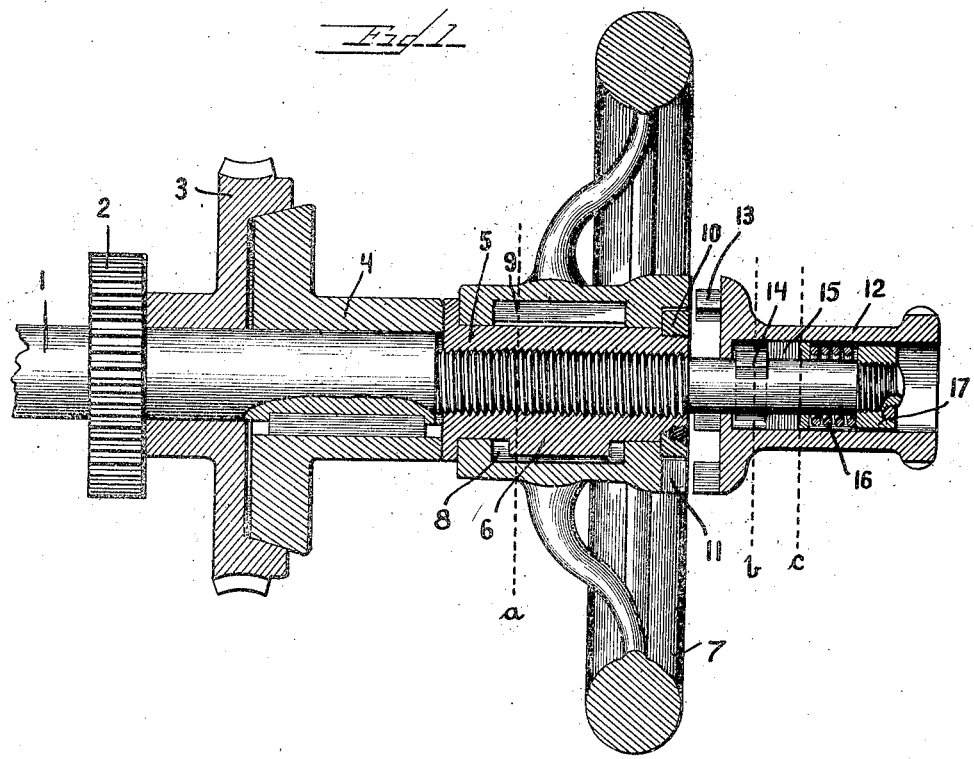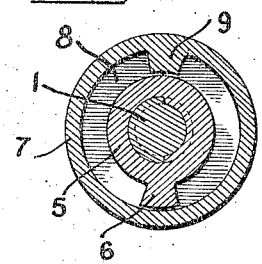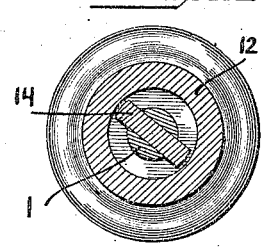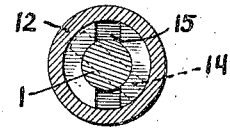

JOHN H. B. BRYAN, OF BUFFALO, NEW YORK, ASSIGNOR TO NILES BEMENT-POND COMPANY, OF JERSEY CITY, NEW JERSEY.

CLUTCH MECHANISM.

No. 812,817.

Specification of Letters Patent.

Patented Feb. 20, 1906.

Application filed January 21, 1904. Serial No. 190,042.

*To all whom it may concern:*

Be it known that I, JOHN H. B. BRYAN, a citizen of the United States, residing at Buffalo, Erie county, New York, (post-office address, Buffalo, New York,) have invented certain new and useful Improvements in Clutch Mechanism, of which the following is a specification.

This invention, while adapted for numerous uses, has been designed with special reference to the feed mechanism of drilling-machines in which a feed-shaft is to be turned sometimes by hand and sometimes by power, the invention directing itself to the system for the clutching of the hand and power devices alternatively to the feed-shaft.

The invention will be readily understood from the following description, taken in connection with the accompanying drawings, in which—

Figure 1 is a vertical longitudinal section of a clutch mechanism exemplifying my invention; Fig. 2, a vertical transverse section in the plane of line *a* of Fig. 1; Fig. 3, a vertical transverse section in the plane of line *b* of Fig. 1, and Fig. 4 a vertical transverse section in the plane of line *c* of Fig. 1.

In the drawings, 1 indicates a shaft—say the feed-shaft of a drilling-machine—to be turned alternatively by hand or by power; 2, a pinion fast thereon and serving as means by which the shaft may transmit motion to other machine parts; 3, a worm-gear loose on the shaft and constituting the element through which motion may be transmitted by machine power to the shaft when it is to be driven by power as distinguished from hand, this gear forming also one element of a friction-clutch; 4, a hub splined upon the shaft and engaging worm-gear 3 and forming the other element of the friction-clutch; 5, a main nut screwed upon the shaft and serving as a means by which the two members of the friction-clutch are forced into active engagement, the friction-clutch being engaged or released by screwing or unscrewing this nut, the exterior of the nut being generally cylindrical; 6, a lug projecting from the periphery of the main nut; 7, a hand-wheel having its hub journaled upon the main nut, this handwheel constituting the agent for turning the shaft or the main nut alternatively; 8, an annular recess within the bore of the hub of the hand-wheel, of a size to permit the handwheel to turn freely through certain angles notwithstanding the presence of lug 6; 9, a lug projecting inwardly from the wall of this recess and adapted to engage lug 6 when the main wheel has been turned upon the main nut through a certain distance; 10, a keeper-nut upon the outer end of the main nut to retain the hand-wheel against endwise displacement from the main nut, the hub of the hand-wheel engaging between this keeper-nut and a collar on the inner end of the main nut; 11, a clutch-face upon the inner end of the hub of the hand-wheel; 12, a sleeve sliding on the outer end of the shaft; 13, a clutch-face on the inner end of this sleeve adapted to coöperate with the clutch-face on the hub of the hand-wheel; 14, a lug projecting from the shaft into and free to turn in an annular recess in sleeve 12 when the sleeve is in endwise position corresponding with the disengagement of its clutch-face from that of the hand-wheel; 15, a notch in the outer wall of the sleeve-recess just referred to adapted to receive lug 14 when clutch-faces 11 and 13 are engaged; 16, a spring on the shaft within sleeve 12 tending to urge the sleeve inwardly so as to engage the clutch-faces, and 17 a collar on the outer end of the shaft to serve as an abutment for the spring.

With the parts in the position seen in Fig. 1 the hand-wheel is free to turn independent of the shaft and of the main nut except as lugs 6 and 9 engage. By turning the hand-wheel in the proper direction till the lugs engage the main nut may be screwed up and the friction tightened and the power-feed set to work. If the friction should slip and the hand prove too weak to set it up with sufficient tightness by ordinary turning of the hand-wheel, then the hand-wheel may be turned back and quickly advanced, so as to screw up the nut with an impactive action of the lugs and, similarly, in unscrewing the main nut to release the friction. Such is the operation of the device as regards the use of the friction-clutch.

In the position shown in Fig. 1 the sleeve is held to outward idle position by lug 14. If the shaft is to be turned by hand, as in the hand-feeding of a machine, then the sleeve 12 is to be turned till notch 15 rests with lug 14, whereupon the spring forces the sleeve inwardly and causes clutch-faces 11 and 13 to engage, thus locking the hand-wheel against rotation on the shaft, it being understood that before this is done the friction-clutch is released. When the hand-power clutch is to be released, the sleeve is pulled outwardly, so as to release the clutch and then turned till lug 14 will lock the sleeve in idle position.

I claim as my invention—

1. In a clutch mechanism, the combination, substantially as set forth, of a shaft, a power-transmitting member loose thereon, a friction-clutch for coupling said loose member to the shaft, a nut threaded upon the shaft for setting the friction-clutch to active condition, a hand-wheel mounted on the nut, and a clutch serving to lock the hand-wheel directly to the shaft, whereby the hand-wheel may serve for turning the shaft within the loose power-transmitting member by hand and also for operating the friction-clutch to lock the power-transmitting member to the shaft.

2. In a clutch mechanism, the combination, substantially as set forth, of a shaft, a power-transmitting member loose thereon, a friction-clutch for coupling said member to the shaft, a nut for setting the friction-clutch to active condition, a hand-wheel for turning the nut and mounted for rotation on the nut, coöperating lugs upon the nut and hand-wheel to serve in limiting their relative rotation, and a clutch to serve in connecting the hand-wheel directly with the shaft.

3. In a clutch mechanism, the combination, substantially as set forth, of a shaft, a power-transmitting member loose thereon, a friction-clutch for coupling said member to the shaft, a nut threaded on the shaft and provided with a lug, a hand-wheel for turning the nut and journaled loosely on the nut and provided with a lug to coöperate with the first-mentioned lug in limiting the relative rotation of the hand-wheel and the nut, said hand-wheel being provided also with a clutch member, a sleeve arranged for endwise adjustment on the shaft and provided with a clutch member to engage the clutch member of the hand-wheel, and a lug to prevent rotation of the sleeve upon the shaft when the sleeve is clutched to the hand-wheel.

4. In a clutch mechanism, the combination, substantially as set forth, of a shaft, a power-transmitting member loose thereon, a friction-clutch for coupling said member to the shaft, a nut threaded on the shaft and provided with a lug, a hand-wheel for turning the nut and journaled loosely on the nut and provided with a lug to coöperate with the first-mentioned lug in limiting the relative rotation of the hand-wheel and the nut, said hand-wheel being provided also with a clutch member on its outer face, a sleeve mounted for endwise and radial motion on the shaft outwardly beyond the hand-wheel and provided on its inner face with a clutch member to coöperate with the clutch member on the hand-wheel, said sleeve being provided also with an inwardly-facing notch, a lug projecting from the shaft and engaging an inner portion of the sleeve and preventing its inward movement except when coinciding with said notch, and a spring arranged to urge the sleeve toward the hand-wheel when said lug coincides with said notch.

5. In a clutch mechanism, the combination, substantially as set forth, of a shaft, two coöperating friction-clutch members thereon to engage by relative endwise movement of said members, a nut threaded on the shaft for producing such endwise movement, a hand-wheel for turning said nut and arranged for limited rotary motion relative thereto, and a pair of coöperating clutch members arranged to clutch the hand-wheel directly to the shaft when the first-mentioned clutch members are disengaged, whereby the hand-wheel may serve, alternatively in actuating the first-mentioned clutch or in actuating the shaft directly.

JOHN H. B. BRYAN.

Witnesses:
FRANK S. COATES.
C. C. BROCK.